(12) United States Patent  
Liu et al.

(10) Patent No.: US 11,796,513 B2  
(45) Date of Patent: Oct. 24, 2023

(54) DUAL CHANNEL NONDESTRUCTIVE TESTING METHOD FOR ROCK BOLT AND RELATED DEVICES

(71) Applicant: Institute of Rock and Soil Mechanics, Chinese Academy of Sciences, Wuhan (CN)

(72) Inventors: Liu Liu, Wuhan (CN); Shaojun Li, Wuhan (CN); Quan Jiang, Wuhan (CN); Yaxun Xiao, Wuhan (CN); Guangliang Feng, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 123 days.

(21) Appl. No.: 17/529,697

(22) Filed: Nov. 18, 2021

(65) Prior Publication Data

US 2023/0120870 A1 Apr. 20, 2023

(30) Foreign Application Priority Data

Oct. 18, 2021 (CN) .......................... 202111211705.4

(51) Int. Cl.
*G01N 29/07* (2006.01)
*G01N 29/44* (2006.01)
*G01N 29/12* (2006.01)

(52) U.S. Cl.
CPC .......... *G01N 29/075* (2013.01); *G01N 29/07* (2013.01); *G01N 29/4463* (2013.01);
(Continued)

(58) Field of Classification Search
CPC .......... E02D 5/74–808; G01B 2210/66; G01N 2291/011; G01N 2291/012;
(Continued)

(56) References Cited

U.S. PATENT DOCUMENTS 4,363,242 A * 12/1982 Heyman .............. G01N 29/075  
73/761  
4,601,207 A * 7/1986 Steblay .................. G01N 29/07  
73/761

FOREIGN PATENT DOCUMENTS

CN 102175195 A * 9/2011  
CN 108692853 A * 10/2018 ............... G01L 5/24  
(Continued)

OTHER PUBLICATIONS

Zhao et al, The Research of Acoustic Wave Non-Destructive Examination Technology for Anchoring Quality of Anchored Bolt, IEEE (Year: 2010).*  
Bačde ič et al, Non-Destructive Evaluation of Rock Bolt Grouting Quality by Analysis of Its Natural Frequencies, Materials, Jan. 8, 2020 (Year: 2020).*  
Song et al, A Review of Rock Bolt Monitoring Using Smart Sensors, Sensors (Year: 2017).*

*Primary Examiner* — David L Singer  
(74) *Attorney, Agent, or Firm* — Westbridge IP LLC

(57) ABSTRACT

A dual channel nondestructive testing method for a rock bolt and related devices includes: determining a target phase difference and an instantaneous phase difference of the first received signal and the second received signal; determining an integral instantaneous phase difference between the first received signal and the second received signal based on the target phase difference and an instantaneous phase difference; determining a length of the exposed section of the rock bolt, a length of the rock bolt and a position of a grouting defect based on the integral instantaneous phase difference, a first velocity of the acoustic signal propagating in an exposed section of the rock bolt and a second velocity of the acoustic signal propagating in an anchor section of the rock bolt.

20 Claims, 5 Drawing Sheets

(52) U.S. Cl.
CPC ........ *G01N 29/12* (2013.01); *G01N 2291/011* (2013.01); *G01N 2291/012* (2013.01); *G01N 2291/0232* (2013.01); *G01N 2291/0258* (2013.01); *G01N 2291/0289* (2013.01); *G01N 2291/044* (2013.01); *G01N 2291/103* (2013.01); *G01N 2291/2691* (2013.01)

(58) Field of Classification Search
CPC ..... G01N 2291/023; G01N 2291/0232; G01N 2291/0258; G01N 2291/0289; G01N 2291/044; G01N 2291/103; G01N 2291/2691; G01N 2291/2698; G01N 29/07; G01N 29/075; G01N 29/12; G01N 29/4463
See application file for complete search history.

(56) References Cited

FOREIGN PATENT DOCUMENTS

| | | | | |
|---|---|---|---|---|
| CN | 113188488 A | * | 7/2021 | ............. G01B 15/00 |
| EP | 0605811 A1 | * | 7/1994 | ................ E02D 5/80 |
| JP | 2006003323 A | * | 1/2006 | |
| JP | 2006003324 A | * | 1/2006 | |
| JP | 2006292482 A | * | 10/2006 | |
| JP | 2006292483 A | * | 10/2006 | |
| JP | 2007308990 A | * | 11/2007 | |
| JP | 2007308991 A | * | 11/2007 | |
| JP | 2019078549 A | * | 5/2019 | |
| KR | 100862028 B1 | * | 10/2008 | ............. E21D 11/10 |
| WO | WO-2021168565 A1 | * | 9/2021 | ........... G01N 29/075 |

* cited by examiner

DUAL CHANNEL NONDESTRUCTIVE TESTING METHOD FOR ROCK BOLT AND RELATED DEVICES

CROSS-REFERENCE TO RELATED APPLICATIONS

The present application claims priority of Chinese Patent Application 202111211705.4, filed on Oct. 18, 2021, entitled "Dual Channel Nondestructive Testing Method for Rock Bolt and Related Devices", the entire contents of which are incorporated herein by reference.

TECHNICAL FIELD

The disclosure relates to geotechnical nondestructive testing technology, in particular to a dual channel nondestructive testing method for a rock bolt and related devices.

BACKGROUND

In order to control displacements of rock stratum, prevent rock burst and strengthen rock structures, a large number of full-length bonded rock bolt have been widely used in slopes, dams, tunnels and mining engineering. However, due to improper controls on grouting process, problems such as slurry leakages and an insufficient anchor length often occur. Due to the complexity and concealment of a structure of a rock bolt, although pull-out tests and borehole coring tests can be used to detect grouting defects, these methods which belong to destructive detections are time-consuming and with high costs. Further, these methods cannot be well used in a scenario with a large number of rock bolts.

Ultrasonic guided wave methods and stress wave reflection methods are two kinds of commonly used nondestructive testing methods. These two kinds of methods can evaluate the quality of a rock bolt by identifying the geometric parameters of the rock bolt, i.e., the length of an exposed section, the length of an anchor section and the size and location of a grouting defect. It is worth noting that the core of these two kinds of methods is to accurately identify arrival times of reflected acoustic signals. However, in practice, a direct wave and multiple reflections from the exposed section of the rock bolt are easy to cover up weak reflections from a grouting defect or from the bottom of the rock bolt, which makes judgments on the acoustic signals quite difficult.

SUMMARY

In view of the above, the present disclosure provides a dual channel nondestructive testing method for a rock bolt and related devices.

According to some examples of the present disclosure, the dual channel nondestructive testing method for a rock bolt may be implemented by a dual channel nondestructive testing device, where the device comprises: a field host, a transmitting transducer, a first receiving sensor and a second receiving sensor.

The method may include the following steps:

exciting, by the transmitting transducer, an acoustic signal;

receiving, by the first receiving sensor, the acoustic signal and recording it as a first received signal;

receiving, by the second receiving sensor, the acoustic signal and recording it as a second received signal;

determining, by the field host, a target phase difference between the first received signal and the second received signal;

determining, by the field host, an instantaneous phase difference between the first received signal and the second received signal;

determining, by the field host, an integral instantaneous phase difference between the first received signal and the second received signal based on the target phase difference and the instantaneous phase difference;

determining a length of the exposed section of the rock bolt, a length of the rock bolt and a position of a grouting defect based on the integral instantaneous phase difference, a first velocity of the acoustic signal propagating in an exposed section of the rock bolt and a second velocity of the acoustic signal propagating in an anchor section of the rock bolt; and outputting, by the field host, the length of the exposed section of the rock bolt, the length of the rock bolt and the position of the grouting defect.

According to some other examples of the present disclosure, the dual channel nondestructive testing device for a rock bolt may include: a field host, a transmitting transducer, a first receiving sensor and a second receiving sensor; where the transmitting transducer is fixed at an end of an exposed section of the rock bolt, configured to excite an acoustic signal;

the first receiving sensor is fixed on the exposed section of the rock bolt, configured to receive the acoustic signal and record it as a first received signal;

the second receiving sensor is fixed on the exposed section of the rock bolt, configured to receive the acoustic signal and record it as a second received signal;

the field host is configured to determine a target phase difference between the first received signal and the second received signal; determine an instantaneous phase difference between the first received signal and the second received signal; determine an integral instantaneous phase difference between the first received signal and the second received signal based on the target phase difference and the instantaneous phase difference; determine a length of the exposed section of the rock bolt, a length of the rock bolt and a position of a grouting defect based on the integral instantaneous phase difference, a first velocity of the acoustic signal propagating in an exposed section of the rock bolt and a second velocity of the acoustic signal propagating in an anchor section of the rock bolt; and output the length of the exposed section of the rock bolt, the length of the rock bolt and the position of the grouting defect.

Examples of the present disclosure also provide a non-transitory computer-readable storage medium, wherein the non-transitory computer-readable storage medium stores computer instructions, and the computer instructions are used to make the computer execute the dual channel nondestructive testing method for the rock bolt.

It can be seen from the above technical scheme, after the transmitting transducer excites an acoustic signal, a first received signal is recorded by the first receiving sensor and a second received signal is recorded by the second receiving sensor. Then, a target phase difference between the first received signal and the second received signal and an instantaneous phase difference between the first received signal and the second received signal are determined. Later, an integral instantaneous phase difference between the first received signal and the second received signal is determined based on the target phase difference and the instantaneous phase difference. At last, the length of the exposed section of the rock bolt, the length of the rock bolt and the position of the grouting defect are determined and output based on the integral instantaneous phase difference, the first velocity of the acoustic signal propagating in an exposed section of the rock bolt and a second velocity of the acoustic signal propagating in an anchor section of the rock bolt. In this way, received acoustic signals can be judged through phase relationships between the two acoustic signals, interferences of noises can be eliminated, arrival times of reflected acoustic signals can be identified automatically and accurately, thus a nondestructive testing for the rock bolt can be implemented and the accuracy of nondestructive testing can be ensured.

BRIEF DESCRIPTION OF DRAWINGS

In order to more clearly explain the examples of the present disclosure or the technical solutions in the prior art, the following is a brief introduction to the drawings to be used in the description of the examples. It is obvious that the drawings described below are only some examples of the present disclosure. For those skilled in the art, without paying creative labor, they can also obtain other drawings from these drawings.

DETAILED DESCRIPTION OF THE EMBODIMENTS

For a better understanding of the objects, aspects and advantages of the present disclosure, references will now be made to the following detailed description taken in conjunction with the accompanying drawings.

It should be noted that, unless defined otherwise, technical or scientific terms used in connection with examples of the present disclosure shall have ordinary meanings understood by those skilled in the art to which this disclosure belongs. As used in this disclosure, the terms "first", "second" and the like do not denote any order, quantity, or importance, but rather are used to distinguish one element from another. The word "comprise", "include" or the like means that an element or an article preceded by the word is inclusive of elements or articles listed after the word and their equivalents, however, does not exclude other elements or articles. Similar terms such as "connect" is not limited to physical or mechanical connections, but may also include electrical connections, whether direct or indirect. "Above", "under", "left" and "right" are used merely to denote relative positional relationships, which may change accordingly when an absolute position of an object being described changes.

As discussed above, ultrasonic guided wave methods and stress wave reflection methods are two kinds of commonly used nondestructive testing methods. These two kinds of methods can evaluate the quality of a rock bolt by identifying the geometric parameters of the rock bolt, i.e., the length of an exposed section, the length of an anchor section and the size and location of a grouting defect. However, the core of these two kinds of methods is to accurately identify arrival times of reflected acoustic signals. However, in practice, a direct wave and multiple reflections from the exposed section of the rock bolt are easy to cover up weak reflections from grouting defects or from the bottom of the rock bolt, which makes judgments on the acoustic signals quite difficult.

In view of the above, the present disclosure provides a dual channel nondestructive testing device for a rock bolt.

Figure 1:
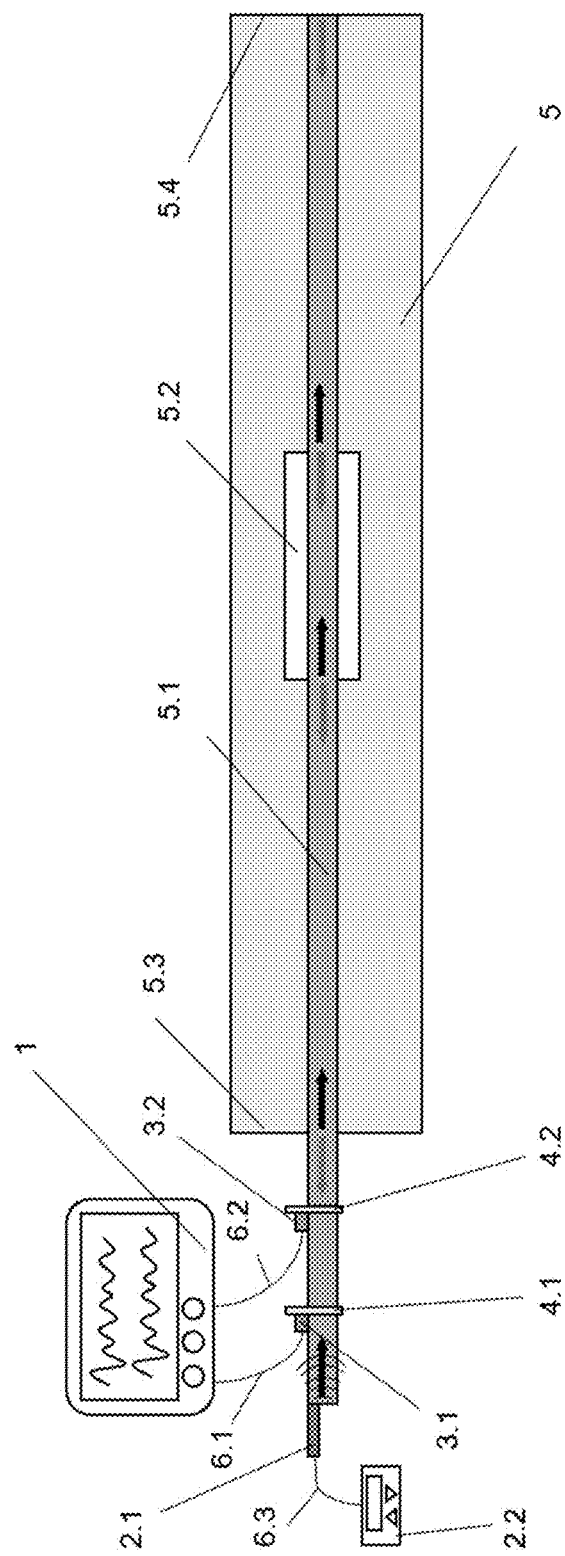
FIG. 1 is a schematic diagram illustrating a structure of a dual channel nondestructive testing device for a rock bolt according to an example of the present disclosure.

FIG. 1 illustrates a structure of the dual channel nondestructive testing device for a rock bolt according to an example of the present disclosure. According to FIG. 1, the device may include: a field host 1, a transmitting transducer 2.1, a first receiving sensor 3.1, and a second receiving sensor 3.2.

According to some examples of the present disclosure, the device may further include: a transmitter 2.2, a first communication cable 6.1, a second communication cable 6.2, a third communication cable 6.3, a first fixing device 4.1 and a second fixing device 4.2.

As shown in FIG. 1, the field host 1 connects to the first receiving sensor 3.1 through the first communication cable 6.1, connects to the second receiving sensor 3.2 through the second communication cable 6.2.

The first receiving sensor 3.1 is fixed on an exposed section of the rock bolt 5 by the first fixing device 4.1. The second receiving sensor 3.2 is fixed on the exposed section of the rock bolt 5 by the second fixing device 4.1. The first receiving sensor 3.1 and the second receiving sensor 3.2 may be arranged at different positions on the exposed section of the rock bolt 5. The distance between the first receiving sensor 3.1 and the second receiving sensor 3.2 can be set in advance according to actual needs.

The transmitting transducer 2.1 connects to the transmitter 2.2 through the third communication cable 6.3. The transmitting transducer 2.1 is fixed at an end of the exposed section of the rock bolt 5 through a built-in magnet. To be noted, the end where the transmitting transducer 2.1 is fixed may be called as a top of the exposed section of the rock bolt 5, also a top of the rock bolt 5. Moreover, the other end of the exposed section of the rock bolt 5 may be called as a bottom of the exposed section of the rock bolt 5. And the other end of the rock bolt 5 may be called as a bottom of the rock bolt 5.

The transmitting transducer 2.1 is configured to excite an acoustic signal. The transmitter 2.2 is configured to adjust a dominant frequency of the acoustic signal excited by the transmitting transducer 2.1.

The first receiving sensor 3.1 is configured to receive the acoustic signal excited by the transmitting transducer 2.1 and record it as a first received signal. The first received signal may be the acoustic signal excited by the transmitting transducer 2.1 and reflected from different part of the rock bolt, such as the bottom of the exposed section of the rock bolt 5, the bottom of the rock bolt 5 and the grouting defect.

The second receiving sensor 3.2 is configured to receive the acoustic signal excited by the transmitting transducer 2.1 and record it as a second received signal. The second received signal may be the acoustic signal excited by the transmitting transducer 2.1 and reflected from different part of the rock bolt, such as the bottom of the exposed section of the rock bolt 5, the bottom of the rock bolt 5 and the grouting defect.

The field host 1 is configured to obtain the first received signal and the second received signal and perform a dual channel nondestructive testing device for the rock bolt 5 to be discussed below to determine and output a length of the exposed section of the rock bolt 5, a length of the rock bolt 5 and a position of a grouting defect.

In the dual channel nondestructive testing device for the rock bolt proposed, two receiving sensors are arranged at different positions on the exposed section of the rock bolt to record acoustic signals respectively, so as to obtain two acoustic signals with time differences. Then, an integral instantaneous phase difference between the two acoustic signals can be calculated. Thus, an arrival time of an acoustic signal reflected from the bottom of the exposed section of the rock bolt, an arrival time of an acoustic signal reflected from the bottom of the rock bolt and an arrival time of an acoustic signal reflected from the location of the grouting defect can be determined through the integral instantaneous phase difference. Through the above process, geometric parameters of the rock bolt can be identified accurately. Thus, a nondestructive testing for the rock bolt can be implemented.

In examples of the present disclosure, the rock bolt 5 can be divided into an exposed section and an anchor section. The exposed section is exposed outside the rocks and is generally composed of an exposed steel bar. The anchor section is generally located inside the rocks and is generally composed of a steel bar wrapped with cement. For example, in FIG. 1, sign 5.1 represents the steel bar of the rock bolt 5. It can be seen, the surface of the steel bar 5.1 in the anchor section is wrapped with grouting cement. Further, in FIG. 1, sign 5.2 represents a grouting defect in the rock bolt 5. Sign 5.3 represents the bottom of the exposed section of the rock bolt 5, and sign 5.4 represents the bottom of the rock bolt.

In accordance with the dual channel nondestructive testing device for a rock bolt, examples of the present disclosure provide a dual channel nondestructive testing method for a rock bolt.

Figure 2:
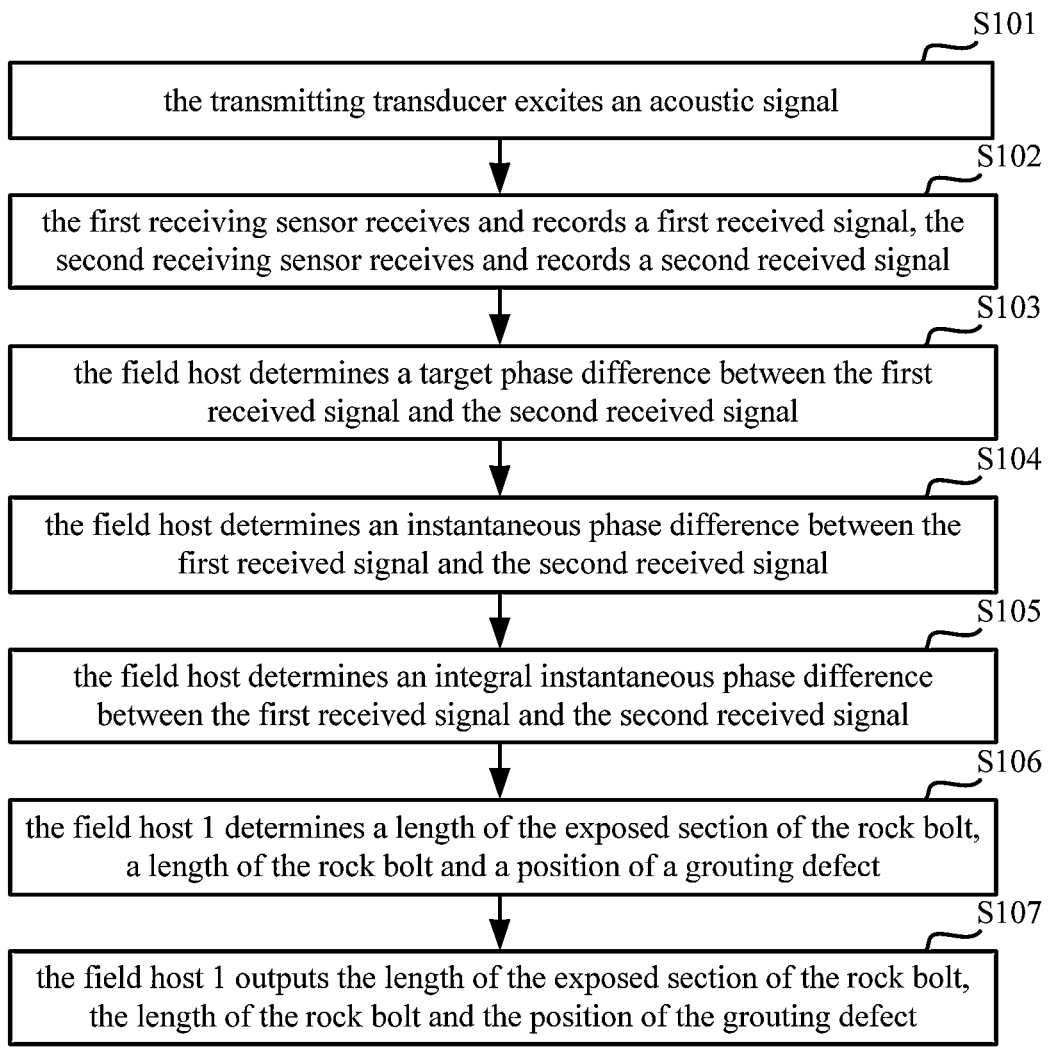
FIG. 2 is a flow chart illustrating a dual channel nondestructive testing method for a rock bolt according to an example of the present disclosure.

FIG. 2 is a flow chart illustrating the dual channel nondestructive testing method for a rock bolt according to an example of the present disclosure. To be noted, the dual channel nondestructive testing method may be implemented by the dual channel nondestructive testing device. As disclosed above, the device may include: a field host 1, a transmitting transducer 2.1, a first receiving sensor 3.1 and a second receiving sensor 3.2. As shown in FIG. 2, the method may include the following steps.

In block S101, the transmitting transducer 2.1 excites an acoustic signal.

In some examples of the present disclosure, a dominant frequency of the acoustic signal excited by the transmitting transducer 2.1 may be adjusted by the transmitter 2.2.

In block S102, the first receiving sensor 3.1 receives the acoustic signal and records it as a first received signal, and the second receiving sensor 3.2 receives the acoustic signal and records it as a second received signal.

As states above, the first received signal may be the acoustic signal excited by the transmitting transducer 2.1 and reflected by different part of the rock bolt. Moreover, the second received signal may also be the acoustic signal excited by the transmitting transducer 2.1 and reflected by different part of the rock bolt.

After that, the field host 1 may obtain the first received signal recorded by the first receiving sensor 3.1 and the second received signal recorded by the second receiving sensor 3.2.

In some examples of the present disclosure, the field host 1 may obtain the first received signal from the first receiving sensor 3.1 through the first communication cable 6.1. The field host 1 may obtain the second received signal from the second receiving sensor 3.2 through the second communication cable 6.2.

In block S103, the field host 1 determines a target phase difference between the first received signal and the second received signal.

According to some examples of the present disclosure, the field host 1 may determine the target phase difference based on a distance between the first receiving sensor and the second receiving sensor, a dominant frequency of the acoustic signal excited by the transmitting transducer 2.1 and a first velocity of the acoustic signal propagating in the exposed section of the rock bolt.

Specifically, the distance between the first receiving sensor and the second receiving sensor may be obtained at first to implement the above step.

In some examples of the present disclosure, the distance may be a preset distance, and the first receiving sensor and the second receiving sensor may be set on the rock bolt according to the present distance.

In some other examples of the present disclosure, the distance may be measured after the first receiving sensor and the second receiving sensor are fixed on the rock bolt.

To be noted, since both the first receiving sensor and the second receiving sensor receive a same acoustic signal excited by a same transmitting transducer 2.1, the first received signal and the second received signal may have a same dominant frequency with the acoustic signal excited by the transmitting transducer 2.1. Therefore, in the process of determining the target phase difference of the first received signal and the second received signal, either the dominant frequency of the first received signal or the dominant frequency of the second received signal may be used as the dominant frequency of the acoustic signal excited by the transmitting transducer 2.1.

While determining the dominant frequency of the acoustic signal excited by the transmitting transducer 2.1, the field host 1 may at first determine a spectrum of the first received signal through Fourier Transform, and then determine the dominant frequency of the first received signal according to the spectrum of the first received signal. Alternatively, the field host 1 may at first determines a spectrum of the second received signal through Fourier Transform, and determine the dominant frequency of the second received signal according to the spectrum of the second received signal.

Figure 3:
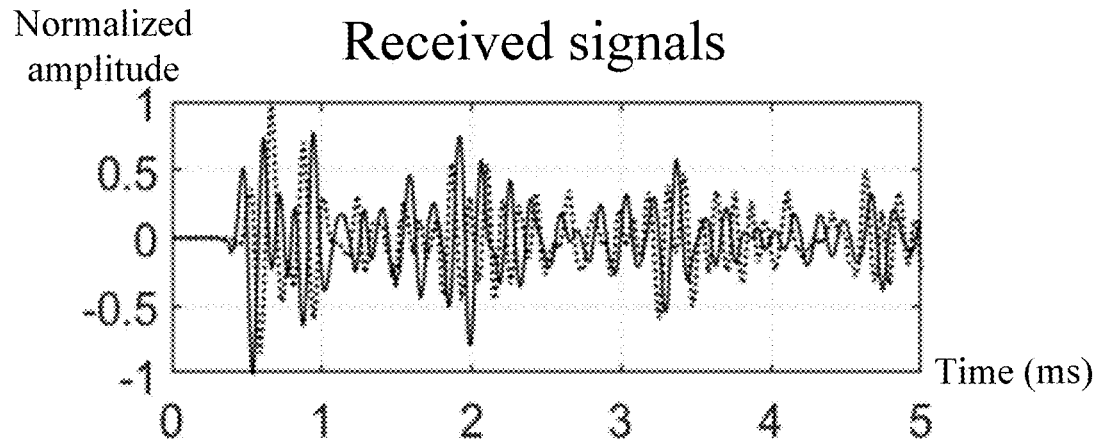
FIG. 3 is a schematic diagram illustrating the first received signal and the second received signal in a time domain.
Figure 4:
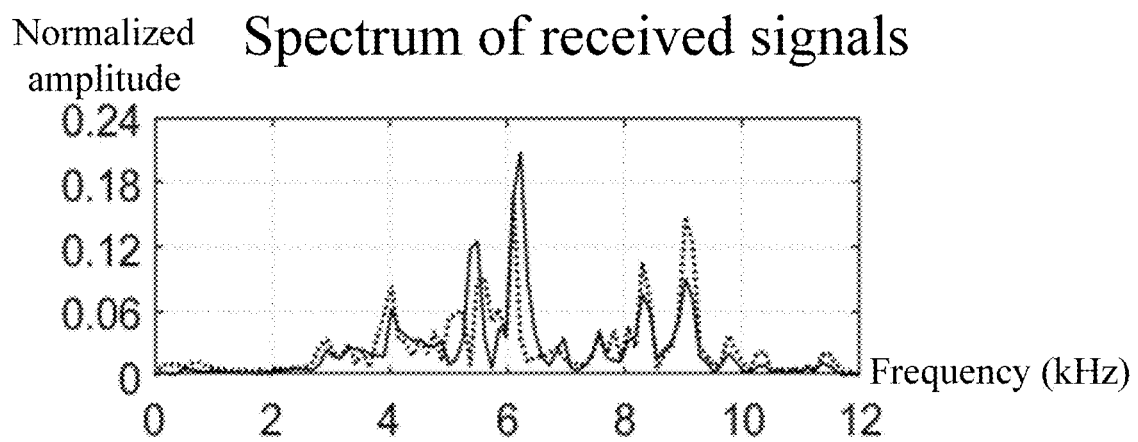
FIG. 4 is a schematic diagram illustrating a spectrum of the first received signal and a spectrum of the second received signal in a frequency domain.

FIG. 3 is a schematic diagram illustrating the first received signal and the second received signal in a time domain. FIG. 4 is a schematic diagram illustrating a spectrum of the first received signal and a spectrum of the second received signal. In FIG. 3, the solid line refers to the first received signal and the dotted line refers to the second received signal. The lateral axis of FIG. 3 refers to time, whose unit is millisecond (ms). The longitudinal axis of FIG. 3 refers to normalized amplitudes of the acoustic signals. The spectrum of the first received signal and the spectrum of the second received signal shown in FIG. 4 may be obtained by performing Fourier Transform on the first received signal and the second received signal shown in FIG. 3 respectively. In FIG. 4, the solid line refers to the spectrum of the first received signal and the dotted line refers to the spectrum of the second received signal. The lateral axis of FIG. 4 refers to frequency, whose unit is Kilohertz (kHz). The longitudinal axis of FIG. 4 refers to normalized amplitudes of the acoustic signals. One would know that the abscissa corresponding to a peak normalized amplitude in FIG. 4 refers to the dominant frequency of the acoustic signal.

Due to the different materials used by the exposed section and the anchor section of the rock bolt and different environments where the exposed section and the anchor section of the rock bolt are, propagation speeds of the acoustic signal in these two sections are different. Generally, during a nondestructive testing, the propagation speed of the acoustic signal in the exposed section and the propagation speed of the acoustic signal in the anchor section will be determined in advance through experiments. In examples of the present disclosure, the first velocity may refer to the propagation speed of the acoustic signal propagating in the exposed section of the rock bolt. The second velocity may refer to the propagation speed of the acoustic signal propagating in the anchor section of the rock bolt.

After obtaining the distance, the dominant frequency of the acoustic signal and the first velocity, the target phase difference between the first received signal and the second received signal can be obtained based on these parameters. Specifically, a time difference between the first received signal and the second received signal can be calculated based on the distance and the first velocity at first. Then the target phase difference can be obtained based on the time difference and the dominant frequency of the acoustic signal.

Specifically, in some examples of the present disclosure, the target phase difference may be determined by the following equation.

$$\theta_e = \frac{df_m}{c_s} \times 2\pi.$$

Where $\theta_e$ represents the target phase difference; d represents the distance between the first receiving sensor and the second receiving sensor; $f_m$ represents the dominant frequency of the acoustic signal; $c_s$ represents the first velocity.

Alternatively, in some other examples of the present disclosure, the field host 1 may determine the target phase difference as a preset angle, such as 90°.

In these examples, the method may further include the following steps: determining a preset interval between the first receiving sensor and the second receiving sensor according to the preset angle, the dominant frequency of the first received signal, and the first velocity; and setting the distance between the first receiving sensor and the second receiving sensor as the preset interval.

In these examples, the preset interval between the first receiving sensor and the second receiving sensor may be determined by the following equation.

$$d_{pre} = \frac{\theta c_s}{2\pi f_m}$$

Where $d_{pre}$ represents the preset interval; $\theta$ represents the preset angle; $f_m$ represents the dominant frequency of the acoustic signal; $c_s$ represents the first velocity.

By the above setting, the target phase difference determined by the distance between the first receiving sensor and the second receiving sensor, the dominant frequency of the first received signal and the first velocity may be the same as the preset angle.

In applications, when the propagation speeds of the acoustic signal in different sections and the dominant frequency of the acoustic signal are determined, the target phase difference may relate only to the distance between the first receiving sensor and the second receiving sensor. In this way, the target phase difference may be controlled by setting the distance between the first receiving sensor and the second receiving sensor as a preset interval. As one would understand, if the target phase difference is 90°, a peak value of an integral loss phase difference would be more obvious, which makes it quite convenient to judge an arrival time of an acoustic signal. Therefore, the preset angle above could be set as 90° or nearly 90°. The specific value of the preset angle would be adjusted according to actual needs. According to the above idea, in some examples of the present disclosure, a preset angle could be set at first, and then the preset interval would be determined based on the preset angle.

In block S104, the field host 1 determines an instantaneous phase difference between the first received signal and the second received signal.

According to some examples of the present disclosure, in the above block S104, the field host 1 may first determine a first instantaneous phase of the first received signal and a second instantaneous phase of the second received signal, and then calculate a difference between the first instantaneous phase and the second instantaneous phase.

According to some examples of the present disclosure, the first instantaneous phase of the first received signal and the second instantaneous phase of the second received signal may be determined by Hilbert Transform.

Specifically, an instantaneous phase of the first received signal may be calculated and regarded as the first instantaneous phase of the first received signal by Hilbert Transform. Further, an instantaneous phase of the second received signal may be calculated and regarded as the second instantaneous phase of the second received signal by Hilbert Transform.

In order to eliminate noises from the acoustic signal, according to other examples of the present disclosure, the above block S104 may include the following steps.

At first, a plurality of first empirical modes corresponding to the first received signal are obtained through Ensemble Empirical Mode Decomposition (EEMD); and a plurality of second empirical modes corresponding to the second received signal are obtained through EEMD.

Later, a part of the first empirical modes and a part of the second empirical modes whose acoustic frequency is greater than a preset threshold are filtered out. Then, a remaining part of the first empirical modes is superimposed to obtain a first reconstructed signal corresponding to the first received signal, and a remaining part of the second empirical mode is superimposed to obtain a second reconstructed signal corresponding to the second received signal.

Moreover, an instantaneous phase of the first reconstructed signal is calculated by Hilbert Transform and an instantaneous phase of the second reconstructed signal is calculated by Hilbert Transform.

Finally, the instantaneous phase of the first reconstructed signal may be determined as the first instantaneous phase; and the instantaneous phase of the second reconstructed signal may be determined as the second instantaneous phase.

In applications, in order to remove high-frequency noises in the acoustic signals and avoid interferences of noises on the acoustic signals, a method of EEMD may be adopted to decompose the first received signal into a plurality of first empirical modes and decompose the second received signal into a plurality of second empirical modes when calculating the instantaneous phase difference. Then, a part of the first empirical modes and a part of the second empirical modes whose frequency is greater than a preset threshold may be filtered to obtain a remaining part of the first empirical modes and a remaining part of the second empirical modes with less noise. Further, the remaining part of the first empirical modes may be superimposed to obtain a first reconstructed signal corresponding to the first received signal and the remaining part of the second empirical modes may be superimposed to obtain a second reconstructed signal corresponding to the second received signal.

Figure 5:
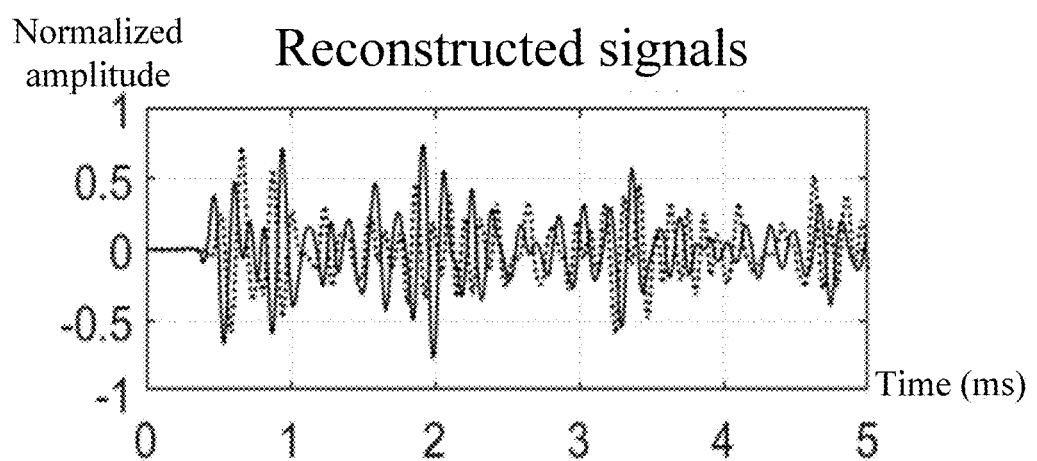
FIG. 5 is a schematic diagram illustrating the first reconstructed signal and the second reconstructed signal in the time domain.

FIG. 5 is a schematic diagram illustrating the first reconstructed signal and the second reconstructed signal in the time domain. In FIG. 5, the solid line refers to the first reconstructed signal and the dotted line refers to the second reconstructed signal. The lateral axis of FIG. 5 refers to time, whose unit is millisecond (ms). The longitudinal axis of FIG. 5 refers to normalized amplitudes of the reconstructed signals.

It can be seen by comparing with FIG. 3, noises in the signals in FIG. 5 are removed, while complete phase information of the signals is retained. Since the first reconstructed signal and the second reconstructed signal remove high-frequency noises in the first received signal and the second received signal, real phases of the acoustic signals can be better reflected. Therefore, the instantaneous phase of the first reconstructed signal may be determined as the first instantaneous phase, and the instantaneous phase of the second reconstructed signal may be determined as the second instantaneous phase.

Figure 6:
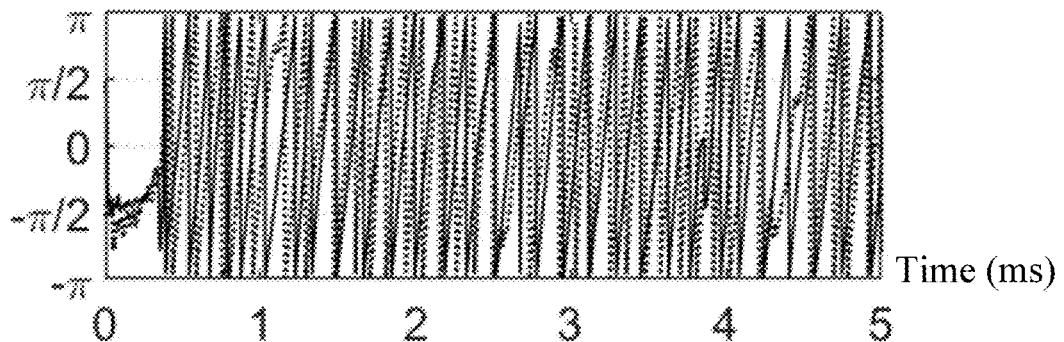
FIG. 6 is a schematic diagram illustrating the first instantaneous phase and the second instantaneous phase in the time domain.

FIG. 6 is a schematic diagram illustrating the first instantaneous phase and the second instantaneous phase in the time domain. In FIG. 6, the solid line refers to the first instantaneous phase and the dotted line refers to the second instantaneous phase. The lateral axis of FIG. 6 refers to time, whose unit is millisecond (ms). The longitudinal axis of FIG. 6 refers to instantaneous phases, whose unit is radian.

After obtaining the first instantaneous phase and the second instantaneous phase, the instantaneous phase difference between the first received signal and the second received signal can be obtained by subtracting the second instantaneous phase from the first instantaneous phase.

Figure 7:
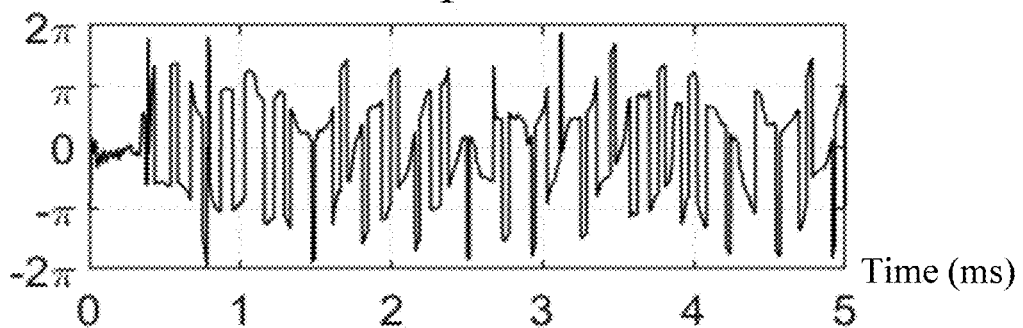
FIG. 7 is a schematic diagram illustrating the instantaneous phase difference in the time domain.

FIG. 7 is a schematic diagram illustrating the instantaneous phase difference in the time domain. The lateral axis of FIG. 7 refers to time, whose unit is millisecond (ms). The longitudinal axis of FIG. 7 refers to the instantaneous phase difference.

In block S105, the field host 1 determines an integral instantaneous phase difference between the first received signal and the second received signal based on the target phase difference and the instantaneous phase difference.

According to some examples of the present disclosure, after obtaining the target phase difference and the instantaneous phase difference between the first received signal and the second received signal, the integrated instantaneous phase difference between the first received signal and the second received signal is obtained based on the target phase difference and instantaneous phase difference. The integral instantaneous phase difference is used to indicate when the instantaneous phase difference of the two acoustic signals is closest to the target phase difference. Generally, the larger the integral instantaneous phase difference is, the closer the instantaneous phase difference of the two acoustic signals is to the target phase difference.

According to some examples of the present disclosure, the integral instantaneous phase difference can be determined by the following equation:

$$I(t_n) = \int_{t_n}^{t_n+T} \left( (|\triangle\theta(t) - \theta_e|)^2 + (2\pi - |\theta_e - \triangle\theta(t)|)^2 \right) dt$$

Where $I(t_n)$ represents an integral instantaneous phase difference corresponding to time $t_n$; T represents a period of the acoustic signal; A $\Delta\theta(t)$ represents the instantaneous phase difference; and $\theta_e$ represents the target phase difference.

It should be noted that, in the present disclosure, by introducing a new reference index, that is, the integral instantaneous phase difference, the relationship between the instantaneous phase difference of the acoustic signals received by two different receiving sensors and the target phase difference can be judged. For example, when the integral instantaneous phase difference reaches a peak, it means the acoustic signal reflected by a special position of the rock bolt 5 is received. In this way, arrival times of the acoustic signals reflected from different positions of the rock bolt can be determined accurately, and interferences of noises on the arrival times of the acoustic signals can be eliminated.

In block S106, the field host 1 determines a length of the exposed section of the rock bolt, a length of the rock bolt and a position of a grouting defect based on the integral instantaneous phase difference, a first velocity of the acoustic signal propagating in an exposed section of the rock bolt and a second velocity of the acoustic signal propagating in an anchor section of the rock bolt.

In applications, after the integral instantaneous phase difference is obtained, arrival times of acoustic signals reflected from different sections of the rock bolt can be obtained based on the integral instantaneous phase difference. Thus, the length of the exposed section of the rock bolt, the length of the rock bolt and the position of the grouting defect can be determined based on the integral instantaneous phase difference, the first velocity and the second velocity. In this way, a nondestructive testing for the rock bolt can be implemented.

According to some examples of the present disclosure, the block S107 may include the following steps.

At first, the integral instantaneous phase difference is normalized to obtain a normalized integral instantaneous phase difference.

Then, a first arrival time of the acoustic signal reflected from the bottom of the exposed section, a second arrival time of the acoustic signal reflected from the bottom of the rock bolt, and a third arrival time of the acoustic signal reflected from the position of the grouting defect can be determined based on the normalized integral instantaneous phase difference.

At last, the length of the exposed section of the rock bolt, the length of the rock bolt and the position of the grouting defect can be determined based on the first velocity, the second velocity, the first arrival time, the second arrival time and the third arrival time.

Specifically, in the above process, in order to facilitate the judgment of the arrival times of the acoustic signal reflected from each section of the rock bolt, the integral instantaneous phase difference should be normalized within a range of 0 to 1.

Then a normalized integral instantaneous phase difference curve would be drawn taking the normalized integral instantaneous phase difference as ordinates and taking the time as abscissas. In the curve, each abscissa corresponding to a peak may be regarded as an arrival time of the acoustic signal reflected from a key position of the rock bolt. For example, an abscissa corresponding to a first peak in the curve may be taken as the first arrival time; an abscissa corresponding to a last peak in the curve may be taken as the second arrival time; and at least one abscissa corresponding to other peaks in the curve may be taken as the third arrival time. That is, there may be more than one third arrival time.

Then, the length of the exposed section of the rock bolt may be determined by multiplying one-half of the first arrival time by the first velocity.

The length of the anchor section of the rock bolt may be determined by multiplying the difference between one-half of the second arrival time and one-half of the first arrival time by the second velocity; and then the length of the rock bolt may be determined by adding the length of the exposed section of the rock bolt and the length of the anchor section of the rock bolt.

Further, the length between the position of the grouting defect and the bottom of the exposed section of rock bolt may be determined by multiplying the difference between one-half of the third arrival time and one-half of the first arrival time by the second velocity; and then the length between the position of the grouting defect and the bottom of the exposed section of the rock bolt and the length of the exposed section of rock bolt may be added to obtain a length between the position of the grouting defect and the top of the rock bolt.

According to some examples of the present disclosure, the third arrival time may include an initial third arrival time and an end third arrival time. In this case, the position of the grouting defect may be determined by the following steps.

Firstly, determining a length between an initial position of the grouting defect and the bottom of the exposed section of rock bolt by multiplying the difference between one-half of the initial third arrival time and one-half of the first arrival time by the second velocity.

Secondly, adding the length between the initial position of the grouting defect and the bottom of the exposed section of the rock bolt and the length of the exposed section of rock bolt to obtain a length between the initial position of the grouting defect and the top of the rock bolt.

Then, determining a length between an end position of the grouting defect and the bottom of the exposed section of rock bolt by multiplying the difference between one-half of the end third arrival time and one-half of the first arrival time by the second velocity.

Finally, adding, by the field host, the length between the end position of the grouting defect and the bottom of the exposed section of the rock bolt and the length of the exposed section of rock bolt to obtain a length between the initial position of the grouting defect and a top of the rock bolt.

According to some other examples of the present disclosure, the method may further include: subtracting the length between the initial position of the grouting defect and the bottom of the exposed section of rock bolt from the length between the end position of the grouting defect and the bottom of the exposed section of rock bolt to obtain a size of the grouting defect; and outputting the size of the grouting defect. Alternatively, the size of the grouting defect may also be determined by multiplying the difference between one-half of the initial third arrival time and one-half of the end third arrival time by the second velocity.

Figure 8:
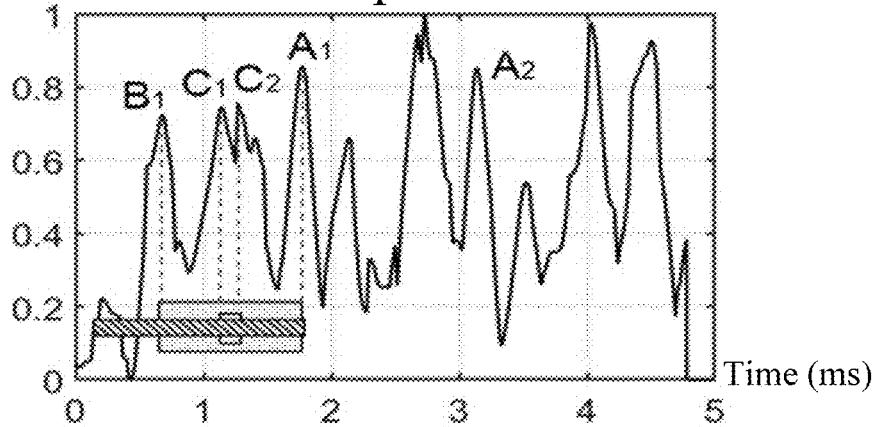
FIG. 8 is a schematic diagram illustrating the normalized integral instantaneous phase difference in the time domain.

FIG. 8 is a schematic diagram illustrating the normalized integral instantaneous phase difference in the time domain. The lateral axis of FIG. 8 refers to time, whose unit is millisecond (ms). The longitudinal axis of FIG. 8 refers to the normalized integral instantaneous phase difference whose attitude is from 0 to 1. The abscissa corresponding to B1 represents the first arrival time of the acoustic signal reflected from the bottom of the exposed section of the rock bolt. The abscissa corresponding to A1 represents the second arrival time of the acoustic signal reflected from the bottom of the rock bolt. The abscissas corresponding to C1 represents the initial third arrival time of the acoustic signal reflected from an initial position of a grouting defect. The abscissas corresponding to C2 represents the end third arrival time of the acoustic signal reflected from an end position of the grouting defect.

In this way, the time taken by the acoustic signal for passing through the grouting defect can be determined based on the abscissas of C1 and C2. Therefore, the size of the grouting defect can be determined based on the time and the velocity of the acoustic signal. After the arrival time of the acoustic signal at each of the above positions of the rock bolt is obtained, the length of the exposed section of the rock bolt, the length of the rock bolt and the position of grouting defects can be calculated based on the velocity of the acoustic signal propagating in each section of the rock bolt.

For example, referring to FIG. 3, when determining the position of the grouting defect, the length between the initial position of the grouting defect and the bottom of the exposed section of rock bolt can be obtained by multiplying the difference between one-half of the abscissa corresponding to C1 and one-half of the abscissa corresponding to B1 by the second velocity. The distance between the end position of the grouting defect and the bottom of the exposed section of the rock bolt can be obtained by multiplying the difference between one-half of the abscissa corresponding to C2 and one-half of the abscissa corresponding to B1 by the second velocity. The length of the exposed section of the rock bolt may be obtained by multiplying one-half of the abscissa corresponding to B1 by the first velocity. The length of the anchor section of the rock bolt may be obtained by multiplying the difference between one-half of the abscissa corresponding to A1 and one-half of the abscissa corresponding to B1 by the second velocity. Therefore, the length of the rock bolt may be obtained by adding the length of the exposed section of the rock bolt and the length of the anchor section of the rock bolt.

Then the distance between the initial position or the end position of the grouting defect and the top of the exposed section of the rock bolt can be obtained by adding the length of the exposed section of the rock bolt to the initial position or the end position of the grouting defect.

In block S107, the field host 1 outputs the length of the exposed section of the rock bolt, the length of the rock bolt and the position of the grouting defect.

In order to illustrate effects of the dual channel nondestructive testing method for the rock bolt disclosed by examples of the present disclosure, a simulated testing experiment has been carried out. In the simulated testing experiment, the actual length of the exposed section is 0.8 m, the actual length of the anchor section is 2.2 m, the total length of the rock bolt is 3 m, and there is a grouting defect at 1.8 m-2.1 m on the rock bolt. After by using the dual channel nondestructive testing method of the present disclosure, a curve as shown in FIG. 3 can be obtained. Then the total length of the rock bolt can be calculated as 3.096 m, the length of the exposed section can be calculated as 0.862 m, and the position of the grouting defect can be determined at 1.749 m-2.117 m based on the arrival times corresponding to A1, B1, C1 and C2 in FIG. 3, the velocity of the acoustic signal propagating in the exposed section and the velocity of the acoustic signal propagating in the anchor section. It can be seen that, the data obtained according to the method proposed are basically the same as the actual data of the rock bolt.

It can be seen from the above technical scheme, at first, a first received signal recorded by the first receiving sensor and a second received signal recorded by the second receiving sensor are obtained. Then, a target phase difference between the first received signal and the second received signal and an instantaneous phase difference between the first received signal and the second received signal are determined. Later, an integral instantaneous phase difference between the first received signal and the second received signal is determined based on the target phase difference and the instantaneous phase difference. At last, the length of the exposed section of the rock bolt, the length of the rock bolt and the position of the grouting defect are determined and output based on the integral instantaneous phase difference, the first velocity and a second velocity of the acoustic signal propagating in an anchor section of the rock bolt. In this way, signals can be judged through phase relationships between the two acoustic signals, interferences of noise can be eliminated, arrival times of reflected signals can be identified automatically and accurately, thus a nondestructive testing for the rock bolt can be implemented and the accuracy of nondestructive testing can be ensured.

At the same time, compared with traditional nondestructive testing method, the device and method of the present disclosure can identify reflections from the initial position of a grouting defect and from the end position of the grouting defect. Therefore, the size of the grouting defect can be detected. Also, multiple grouting defects can be identified in one detecting process.

Moreover, the device and method of the disclosure can be used to detect the rock bolt with a long-exposed section. In the traditional detections, the reflections of a long-exposed section may have a great impact on the analysis of the acoustic signal, because the multiple reflections from the bottom of the exposed section may mask other effective reflections. However, the device and the method of the disclosure can effectively distinguish an effective reflection from multiple reflections from the bottom of the exposed section. Therefore, the impact brought by the multiple reflections would be eliminated. In addition, the device and the method of the present disclosure can convert the multiple reflections into effective signals, take the multiple reflections as a basis for verification to further reduce the detection error.

It should be noted that the method according to examples of the present disclosure may be performed by a single device, such as a computer or server. Moreover, the method according to examples of the present disclosure can also be applied to a distributed scenario, wherein the method can be implemented through cooperation of multiple devices. In the case of such a distributed scenario, one device of the plurality of devices may only perform one or more steps of the method, and the plurality of devices may interact with each other to perform the described method.

It is noted that some examples of the present disclosure have been described above. Other examples are within the scope of the following claims. In some cases, the acts or steps recited in the claims may be performed in a different order than in the examples described above and can still achieve desirable results. Additionally, the processes depicted in the accompanying drawings do not necessarily require the particular order shown, or sequential order, to achieve desirable results. In some examples, multi-tasking and parallel processing are also possible or may be advantageous.

Figure 9:
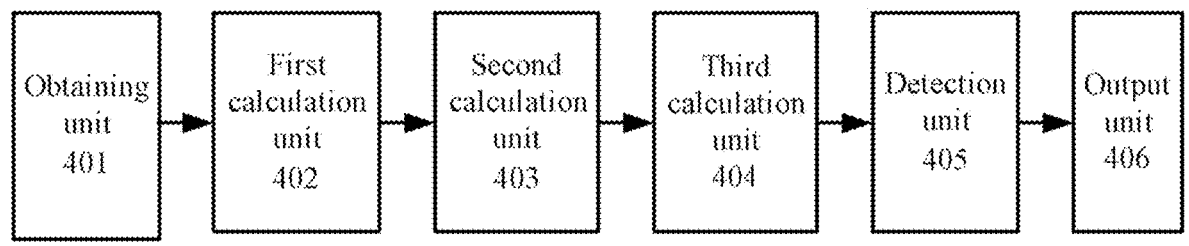
FIG. 9 is a schematic diagram illustrating a structure of a field host according to an example of the present disclosure.

Based on the dual channel nondestructive testing device for a rock bolt, examples of the present disclosure also provide a field host. FIG. 9 is a schematic diagram illustrating a structure of a field host according to an example of the present disclosure. According to FIG. 9, the field host may include the following modules: an obtaining unit 401, a first calculation unit 402, a second calculation unit 403, a third calculation unit 404, a detection unit 405, and an output unit 406.

The obtaining unit 401 is configured to obtain the first received signal recorded by the first receiving sensor and the second received signal recorded by the second receiving sensor.

The first calculation unit 402 is configured to determine a target phase difference between the first received signal and the second received signal.

The second calculation unit 403 is configured to determine an instantaneous phase difference between the first received signal and the second received signal.

The third calculation unit 404 is configured to determine an integral instantaneous phase difference between the first received signal and the second received signal based on the target phase difference and the instantaneous phase difference.

The detection unit 405 is configured to determine a length of the exposed section of the rock bolt, a length of the rock bolt and a position of a grouting defect based on the integral instantaneous phase difference, the first velocity and the second velocity of the acoustic signal propagating in an anchor section of the rock bolt.

The output unit 406 is configured to output the length of the exposed section of the rock bolt, the length of the rock bolt and the position of the grouting defect.

For the convenience of description, the above device is divided into various modules according to their functions. Of course, in implementing the present disclosure, the functions of each module can be implemented in the same or more software and/or hardware.

The field host of the present disclosure is used to realize the dual channel nondestructive testing method for a rock bolt in accordance with any of the above examples, and has the beneficial effects of the corresponding method, which will not be repeated here.

Examples of the present disclosure also provides an electronic device, which includes a memory, a processor, and a computer program stored in the memory and executable on the processor, wherein the processor executes the program to implement the dual channel nondestructive testing method.

Figure 10:
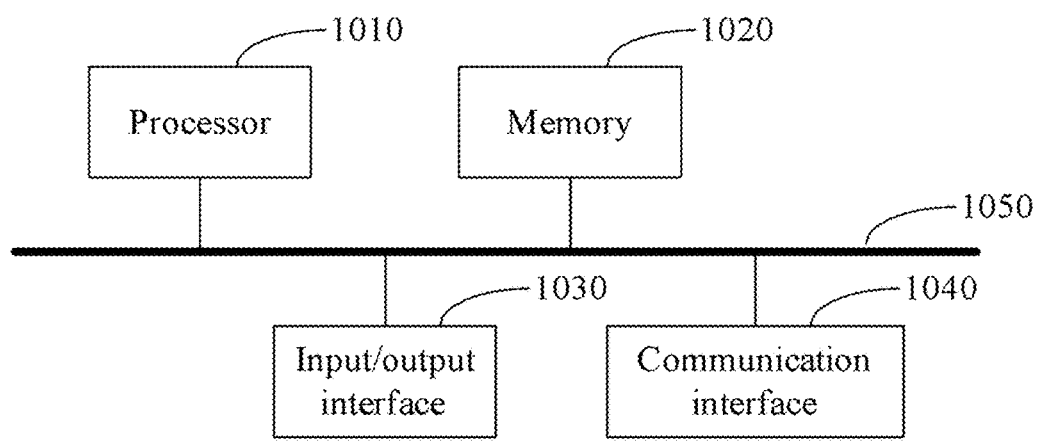
FIG. 10 is a schematic diagram illustrating a structure of an electrical device according to an example of the present disclosure.

FIG. 10 is a schematic diagram illustrating a structure of an electronic device according to some examples of the present disclosure. As shown in FIG. 10, the electronic device may include: a processor 1010, a memory 1020, an input/output interface 1030, a communication interface 1040, and a bus 1050. The processor 1010, the memory 1020, the input/output interface 1030, and the communication interface 1040 may couple to each other via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures. When the technical solution provided by the example of the description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The electronic device according to the foregoing examples is used for implementing the corresponding dual channel nondestructive testing method in any one of the foregoing examples, and has the beneficial effects of the corresponding method examples, which are not repeated in detail.

The flowcharts and block diagrams in the drawings illustrate the system architecture, functionality, and operation possibly implemented by systems, methods and computer program products according to various examples of the present invention. In this regard, each block in the flowcharts or block diagrams may represent a unit, program segment, or portion of code, which comprises one or more executable instructions for implementing the specified logical function(s). It should also be also noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It should also be also noted that each block and combination of blocks in the flowcharts or block diagrams can be implemented by special purpose hardware-based systems which perform the specified functions or steps, or combinations of special purpose hardware and computer instructions.

The units or units involved in the examples of the present disclosure may be implemented by means of software or programmable hardware. The depicted units or units may be also arranged in the processor, and the titles of these units or units do not constitute the definition thereof in some cases.

Based on the same inventive concept, corresponding to the methods according to any one of the foregoing examples, the present disclosure further provides a non-transitory computer readable storage medium which stores a computer instruction used for enabling the computer to perform the dual channel nondestructive testing method for a rock bolt according to any one of the examples.

The computer readable medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

The computer instruction stored by the storage medium according to the foregoing examples is used for enabling the computer to perform the dual channel nondestructive testing method for a rock bolt according to any one of the examples, and has the beneficial effects of the corresponding method examples, which are not repeated in detail.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g., circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A dual channel nondestructive testing method for a rock bolt, implemented by a dual channel nondestructive testing device, wherein the device comprises: a field host, a transmitting transducer, a first receiving sensor and a second receiving sensor; wherein the method comprises:
   exciting, by the transmitting transducer, an acoustic signal;
   receiving, by the first receiving sensor, the acoustic signal and recording it as a first received signal;
   receiving, by the second receiving sensor, the acoustic signal and recording it as a second received signal;
   determining, by the field host, a target phase difference between the first received signal and the second received signal;
   determining, by the field host, an instantaneous phase difference between the first received signal and the second received signal;
   determining, by the field host, an integral instantaneous phase difference between the first received signal and the second received signal based on the target phase difference and the instantaneous phase difference;
   determining, by the field host, a length of an exposed section of the rock bolt, a length of the rock bolt and a position of a grouting defect based on the integral instantaneous phase difference, a first velocity of the acoustic signal propagating in the exposed section of the rock bolt and a second velocity of the acoustic signal propagating in an anchor section of the rock bolt; and
   outputting, by the field host, the length of the exposed section of the rock bolt, the length of the rock bolt and the position of the grouting defect.

2. The method of claim 1, wherein determining, by the field host, the target phase difference between the first received signal and the second received signal comprises:
   determining, by the field host, the target phase difference between the first received signal and determining, by the field host, the target phase difference between the first received signal and the second received signal based on a distance between the first receiving sensor and the second receiving sensor, a dominant frequency of the acoustic signal and the first velocity.

3. The method of claim 2, wherein the target phase difference is determined by:

$$\theta_e = \frac{df_m}{c_s} \times 2\pi$$

wherein $\theta_e$ represents the target phase difference; d represents the distance between the first receiving sensor and the second receiving sensor; $f_m$ represents the dominant frequency; $c_s$ represents the first velocity.

4. The method of claim 1, wherein determining, by the field host, the target phase difference between the first received signal and the second received signal comprises:
   determining, by the field host, the target phase difference between the first received signal and determining, by the field host, the target phase difference between the first received signal and the second received signal as a present angle.

5. The method of claim 4, further comprising:
   determining a preset interval according to a preset angle, a dominant frequency of the acoustic signal, and the first velocity; and
   setting a distance between the first receiving sensor and the second receiving sensor as the preset interval.

6. The method of claim 5, wherein the preset interval is determined by:

$$d_{pre} = \frac{\theta c_s}{2\pi f_m}$$

wherein $d_{pre}$ represents the preset interval; $\theta$ represents the preset angle, $f_m$ represents the dominant frequency of the acoustic signal; $c_s$ represents the first velocity.

7. The method of claim 1, wherein determining, by the field host, an instantaneous phase difference between the first received signal and the second received signal comprises:
   determining, by the field host, a first instantaneous phase of the first received signal and a second instantaneous phase of the second received signal; and
   determining, by the field host, the instantaneous phase difference between the first received signal and the second received signal by subtracting the second instantaneous phase from the first instantaneous phase.

8. The method of claim 7, wherein determining, by the field host, the first instantaneous phase of the first received signal and the second instantaneous phase of the second received signal comprises:
   determining, by the field host, the first instantaneous phase of the first received signal and the determining, by the field host, the first instantaneous phase of the first received signal and the second instantaneous phase of the second received signal by Hilbert Transform.

9. The method of claim 7, wherein determining, by the field host, the first instantaneous phase of the first received signal and the second instantaneous phase of the second received signal comprises:
   obtaining, by the field host, a plurality of first empirical modes corresponding to the first received signal through Ensemble Empirical Mode Decomposition (EEMD);
   obtaining, by the field host, a plurality of second empirical modes corresponding to the second received signal through EEMD;
   filtering out, by the field host, a part of the first empirical modes and a part of the second empirical modes whose acoustic frequency is greater than a preset threshold;

superimposing, by the field host, a remaining part of the first empirical modes to obtain a first reconstructed signal corresponding to the first received signal;

superimposing, by the field host, a remaining part of the second empirical mode to obtain a second reconstructed signal corresponding to the second received signal;

calculating, by the field host, an instantaneous phase of the first reconstructed signal by Hilbert Transform;

calculating, by the field host, an instantaneous phase of the second reconstructed signal by Hilbert Transform;

determining, by the field host, the instantaneous phase of the first reconstructed signal as the first instantaneous phase; and determining, by the field host, the instantaneous phase of the second reconstructed signal as the second instantaneous phase.

10. The method of claim 1, wherein the integral instantaneous phase difference is determined by:

$$I(t_n) = \int_{t_n}^{t_n+T} \left( (|\Delta\theta(t) - \theta_e|)^2 + (2\pi - |\theta_e - \Delta\theta(t)|)^2 \right) dt$$

wherein $I(t_n)$ represents an integral instantaneous phase difference corresponding to time $t_n$; T represents a period of the first received signal; $\Delta\theta(t)$ represents the instantaneous phase difference; and $\theta_e$ represents the target phase difference.

11. The method of claim 1, wherein determining, by the field host, the length of the exposed section of the rock bolt, the length of the rock bolt and the position of the grouting defect comprises:

normalizing, by the field host, the integral instantaneous phase difference to obtain a normalized integral instantaneous phase difference;

determining, by the field host, a first arrival time of the acoustic signal reflected from a bottom of the exposed section, a second arrival time of the acoustic signal reflected from a bottom of the rock bolt, and a third arrival time of the acoustic signal reflected from the position of the grouting defect based on the normalized integral instantaneous phase difference; and determining, by the field host, the length of the exposed section of the rock bolt, the length of the rock bolt and the position of the grouting defect based on the first velocity, the second velocity, the first arrival time, the second arrival time and the third arrival time.

12. The method of claim 11, wherein determining, by the field host, the first arrival time of the acoustic signal reflected from the bottom of the exposed section, the second arrival time of the acoustic signal reflected from the bottom of the rock bolt, and the third arrival time of the acoustic signal reflected from the position of the grouting defect based on the normalized integral instantaneous phase difference comprises:

drawing a normalized integral instantaneous phase difference curve taking the normalized integral instantaneous phase differences as ordinates and taking the time as abscissas;

taking an abscissa corresponding to a first peak in the curve as the first arrival time;

taking an abscissa corresponding to a last peak in the curve as the second arrival time;

taking at least one abscissa corresponding to other peaks in the curve as the third arrival time.

13. The method of claim 11, wherein determining, by the field host, the length of the exposed section of the rock bolt comprises:

determining, by the field host, the length of the exposed section of the rock bolt by multiplying one-half of the first arrival time by the first velocity.

14. The method of claim 13, wherein determining, by the field host, the length of the rock bolt comprises:

determining, by the field host, a length of the anchor section of the rock bolt by multiplying the difference between one-half of the second arrival time and one-half of the first arrival time by the second velocity; and determining, by the field host, the length of the rock bolt by adding the length of the exposed section of the rock bolt and the length of the anchor section of the rock bolt.

15. The method of claim 13, wherein determining, by the field host, the position of the grouting defect comprises:

determining, by the field host, a length between the position of the grouting defect and the bottom of the exposed section of the rock bolt by multiplying the difference between one-half of the third arrival time and one-half of the first arrival time by the second velocity; and adding, by the field host, the length between the position of the grouting defect and the bottom of the exposed section of the rock bolt and the length of the exposed section of the rock bolt to obtain a length between the position of the grouting defect and a top of the rock bolt.

16. The method of claim 13, wherein the third arrival time comprises an initial third arrival time and an end third arrival time;

determining, by the field host, the position of the grouting defect comprises:

determining, by the field host, a length between an initial position of the grouting defect and a bottom of the exposed section of the rock bolt by multiplying the difference between one-half of the initial third arrival time and one-half of the first arrival time by the second velocity; and adding, by the field host, the length between the initial position of the grouting defect and the bottom of the exposed section of the rock bolt and the length of the exposed section of the rock bolt to obtain a length between the initial position of the grouting defect and a top of the rock bolt;

determining, by the field host, a length between an end position of the grouting defect and the bottom of the exposed section of the rock bolt by multiplying the difference between one-half of the end third arrival time and one-half of the first arrival time by the second velocity; and adding, by the field host, the length between the end position of the grouting defect and the bottom of the exposed section of the rock bolt and the length of the exposed section of the rock bolt to obtain a length between the initial position of the grouting defect and a top of the rock bolt.

17. The method of claim 16, further comprising:

subtracting the length between the initial position of the grouting defect and the bottom of the exposed section of the rock bolt from the length between the end position of the grouting defect and the bottom of the exposed section of the rock bolt to obtain a size of the grouting defect; and outputting the size of the grouting defect.

18. A dual channel nondestructive testing device for a rock bolt, comprising: a field host, a transmitting transducer, a first receiving sensor and a second receiving sensor; wherein the transmitting transducer is fixed at an end of an exposed section of the rock bolt, configured to excite an acoustic signal;

the first receiving sensor is fixed on the exposed section of the rock bolt, configured to receive the acoustic signal excited by the transmitting transducer and record it as a first received signal;

the second receiving sensor is fixed on the exposed section of the rock bolt, configured to receive the acoustic signal excited by the transmitting transducer and record it as a second received signal;

the field host is configured to determine a target phase difference between the first received signal and the second received signal;

determine an instantaneous phase difference between the first received signal and the second received signal;

determine an integral instantaneous phase difference between the first received signal and the second received signal based on the target phase difference and the instantaneous phase difference;

determine a length of the exposed section of the rock bolt, a length of the rock bolt and a position of a grouting defect based on the integral instantaneous phase difference, a first velocity of the acoustic signal propagating in the exposed section of the rock bolt and a second velocity of the acoustic signal propagating in an anchor section of the rock bolt; and output the length of the exposed section of the rock bolt, the length of the rock bolt and the position of the grouting defect.

19. The device of claim 18, further comprising:

a transmitter, configured to adjust a dominant frequency of the acoustic signal excited by the transmitting transducer.

20. A non-transitory computer-readable storage medium, wherein, the non-transitory computer-readable storage medium stores computer instructions, and when the computer instructions are executed by a processor, the following operations are implemented:

determining a target phase difference between a first received signal and a second received signal;

determining an instantaneous phase difference between the first received signal and the second received signal;

determining an integral instantaneous phase difference between the first received signal and the second received signal based on the target phase difference and the instantaneous phase difference;

determining a length of an exposed section of a rock bolt, a length of the rock bolt and a position of a grouting defect based on the integral instantaneous phase difference, a first velocity of the acoustic signal propagating in the exposed section of the rock bolt and a second velocity of the acoustic signal propagating in an anchor section of the rock bolt; and outputting the length of the exposed section of the rock bolt, the length of the rock bolt and the position of the grouting defect.

\* \* \* \* \*